US008204038B2

(12) United States Patent
Wang et al.

(10) Patent No.: US 8,204,038 B2

(45) Date of Patent: Jun. 19, 2012

(54) METHOD FOR EFFICIENT UTILIZATION OF RADIO RESOURCES IN WIRELESS COMMUNICATIONS SYSTEM

(75) Inventors: Chao-Chun Wang, Taipei (TW); Chih-Shi Yee, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 339 days.

(21) Appl. No.: 12/685,088

(22) Filed: Jan. 11, 2010

(65) Prior Publication Data

US 2010/0177724 A1 Jul. 15, 2010

Related U.S. Application Data

(60) Provisional application No. 61/144,189, filed on Jan. 13, 2009.

(51) Int. Cl.
*H04J 3/06* (2006.01)
*H04J 3/12* (2006.01)

(52) U.S. Cl. ......................... 370/350; 370/503; 370/522

(58) Field of Classification Search .......... 370/310–350, 370/503, 522

See application file for complete search history.

(56) References Cited

U.S. PATENT DOCUMENTS

| | | | | |
|---|---|---|---|---|
| 7,447,180 | B2 * | 11/2008 | Jeong et al. | 370/350 |
| 7,489,656 | B2 * | 2/2009 | Guo et al. | 370/329 |
| 7,899,460 | B2 * | 3/2011 | Kwon | 455/450 |
| 2003/0031146 | A1 * | 2/2003 | Sugaya | 370/336 |
| 2003/0137970 | A1 * | 7/2003 | Odman | 370/350 |
| 2004/0114563 | A1 * | 6/2004 | Shvodian | 370/347 |
| 2005/0120097 | A1 | 6/2005 | Walton et al. | |
| 2007/0064742 | A1 * | 3/2007 | Shvodian | 370/503 |
| 2007/0280184 | A1 * | 12/2007 | Shin et al. | 370/338 |
| 2009/0310574 | A1 * | 12/2009 | Jeon et al. | 370/336 |
| 2010/0128679 | A1 * | 5/2010 | Kwon | 370/329 |

FOREIGN PATENT DOCUMENTS

| | | | |
|---|---|---|---|
| CN | 1842040 | A | 10/2006 |
| CN | 101171819 | A | 4/2008 |
| WO | WO 2007/111474 | | 10/2007 |

OTHER PUBLICATIONS

English abstract of CN101171819A; pub. Apr. 30, 2008.
English abstract of CN1842040A; pub. Oct. 4, 2006.

* cited by examiner

*Primary Examiner* — Warner Wong
(74) *Attorney, Agent, or Firm* — Thomas|Kayden

(57) ABSTRACT

The invention provides a wireless communications system. In one embodiment, the wireless communications system comprises a coordinating communications device, a source communications device, and a sink communications device. The coordinating communications device transmits a predetermined bits sequence at the beginning of a radio frame at a rate of a first fixed interval. The source communications device receives frames of a streaming session, detects a duration and first starting time of a frame, and wherein forwards information about the duration and the first starting time of one or more of the frames to the coordinating communications device. The coordinating communications device then determines the duration of a second fixed interval and second starting time in accordance with a predetermined rule based on the information received from the source communications device. The coordinating communications device then transmits the predetermined bits sequence at the second starting time of a radio frame at a rate of the second fixed interval, and the source communications device forwards the frames to a sink communications device.

22 Claims, 4 Drawing Sheets

200

Coordinating communications device — 202

Radio frames

Radio frames

204 — Video source communications device

Video frames

Video sink communications device — 206

METHOD FOR EFFICIENT UTILIZATION OF RADIO RESOURCES IN WIRELESS COMMUNICATIONS SYSTEM

CROSS REFERENCE TO RELATED APPLICATIONS

This application claims the benefit of U.S. Provisional Application No. 61/144,189, filed on Jan. 13, 2009, the entirety of which is incorporated by reference herein.

BACKGROUND OF THE INVENTION

1. Field of the Invention

The invention relates to wireless communications systems, and more particularly to efficient utilization of radio resources of wireless communications systems.

2. Description of the Related Art

Wireless communications systems can be classified into contention-based systems and coordination-based systems. No channel resource is pre-allocated in a contention-based system. When communications devices of a contention-based system want to transmit radio signals, the communications devices compete for the channel resource and access time of a radio link in a collision-based manner. There is no coordinating communications device that manages channel resources for contention-based systems. A coordination-based system, however, comprises a coordinating communications device which allocates radio resources of the wireless communications system. All communications devices of the coordination-based system must obey instructions of the coordinating communications device to transmit radio signals.

A radio signal is transmitted with a sequence of radio frames. A coordinating communications device of a communications system determines duration of a radio frame and broadcasts the radio frame duration to all communications devices of the communications system. Thus, all communications devices of the communications system transmit data within radio frames. In one embodiment, the coordinating communications device determines length of the radio frame duration according to a set of parameters comprising radio channel characteristics and a number of active communications devices in the communications system. In addition, the coordinating communications device broadcasts a series of beacons to all communications devices of the communications systems to synchronize radio frame transmission in the communications systems. A beacon is a predetermined bit pattern marking the beginning of a radio frame. The coordinating communications device may transmit a beacon for every radio frame or for a predetermined number of radio frames.

A streaming video comprises a sequence of video frames, wherein each video frame comprises a plurality of pixels. The duration of a video frame is determined by a refresh rate of a video rendering device generating the video frame. For example, when a video rendering device generates 60 frames per second, the duration of each video frame is 1/60 second. After a streaming video session starts, duration of video frames of the streaming session remains unchanged until the streaming video session is terminated. In a video streaming session, video frames are streamed in real-time, non-stop-and-go from a video source device to a video sink device. Accuracy of timings for transmitting video frames is essential because a timing error will create visible glitches when the video frames are displayed by the video sink device.

When a communications system comprises a video source device and a video sink device, the video source device transmits video frames of a streaming video session to the video sink device within radio frames. A coordinating communications device of the communications system broadcasts radio frame duration and beacons to the video source device and the video sink device. The video source device then transmits the video streaming session within radio frames having the radio frame duration determined by the coordinating communications device and starting time determined by the beacons. The starting time and duration of video frames of the video streaming session, however, is determined by a video rendering device connected to the video source device. Since the communications system and video play back system operate independently, the starting time and duration of the video frames and the radio frames will naturally be different. Mismatch of duration and starting time between video frames and radio frames increases design complexity of communications systems.

Referring to FIG. 1, a schematic diagram of conventional radio transmission of video frames is shown. A series of video frames $V_1, V_2, \ldots, V_x$ are transmitted by a series of radio frames $R_1, R_2, \ldots, R_y$. Each of the video frames has a duration $T_V$, and each of the radio frames has a duration $T_R$. The beacons $B_1$, $B_2$, and $B_3$ transmitted before the radio frame $R_1$, $R_2$, and $R_3$ are used to inform and synchronous with the receiving devices. The starting times $t_{s1}$, $t_{s2}$, and $t_{s3}$ of the video frames $V_1$, $V_2$, and $V_3$ are different to the starting times $t_{b1}$, $t_{b2}$, and $t_{b3}$ of the radio frames, and the duration $T_V$ of the video frames $V_1$, $V_2$, and $V_3$ is different to the duration $T_R$ of the radio frames $R_1$, $R_2$, and $R_3$. The design of the communications system for transmitting the video frames becomes complicated by the need to buffer video frames when a radio frame is unavailable. In addition, to guarantee flow continuity of the video frames, the video source device must comprise a buffer, to buffer enough video frames before the video frames are forwarded to the video sink device. The addition of the buffer, increases the cost of the video source device. Thus, a method for efficient utilization of radio resources for transmitting real-time streaming video is preferred.

BRIEF SUMMARY OF THE INVENTION

The invention provides a wireless communications system. In one embodiment, the wireless communications system comprises a coordinating communications device, a source communications device, and a sink communications device. The coordinating communications device transmits a predetermined bits sequence at the beginning of a radio frame at a rate of a first fixed interval. The source communications device receives frames such as video frames of a streaming session, detects a duration and first starting time of each frame, and wherein forwards information about the duration and the first starting time of one or more of the frames to the coordinating communications device. The coordinating communications device then determines the duration of a second fixed interval and second starting time for transmitting the predetermined bits sequence at the beginning of a radio frame in accordance with a predetermined rule based on the information received from the source communications device, wherein the difference between the first and second starting time is less than a predetermined value. The coordinating communications device then transmits the predetermined bits sequence at the second starting time of a radio frame at a rate of the second fixed interval, and the source communications device forwards the frames to a sink communications device.

The invention also provides a method for efficient utilization of radio resources. In one embodiment, a wireless communications system comprises a coordinating communications device, a source communications device, and a sink communications device, and the source communications device receives frames of a streaming session to be forwarded to the sink communications device. First, a predetermined bits sequence is transmitted at the beginning of a radio frame by the coordinating communications device at a rate of a first fixed interval. Duration of a second fixed interval and a second starting time for transmitting the predetermined bits sequence at the beginning of a radio frame are then determined by the coordinating communications device in accordance with a predetermined rule based on information received from the source communications device, wherein the information comprises duration and first starting time of one or more of the frames of the streaming session. The predetermined bits sequences are then transmitted by the coordinating communications device at the second starting time of a radio frame at a rate of the second fixed interval.

The invention further provides a method for efficient utilization of radio resources. In one embodiment, a wireless communications system comprises a coordinating communications device, a source communications device, and a sink communications device, and the coordinating communications device transmits a predetermined bits sequence at the beginning of a radio frame at a rate of a first fixed interval. First, frames of a streaming session are received by the source communications device. A duration and first starting time of the frames are then detected by the communications device. Information about the duration and the first starting time of one or more of the frames of the streaming session is then forwarded by the source communications device to the coordinating communications device. After the coordinating communications device determines the duration of a second fixed interval and a second starting time for transmitting the predetermined bits sequence at the beginning of a radio frame in accordance with a predetermined rule based on the information received from the source communications device and transmits the predetermined bits sequence at the second starting time of a radio frame at a rate of the second fixed interval, the frames are forwarded by the source communications device to the sink communications device in accordance with the radio frames having the duration of the second fixed interval and the second starting time A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
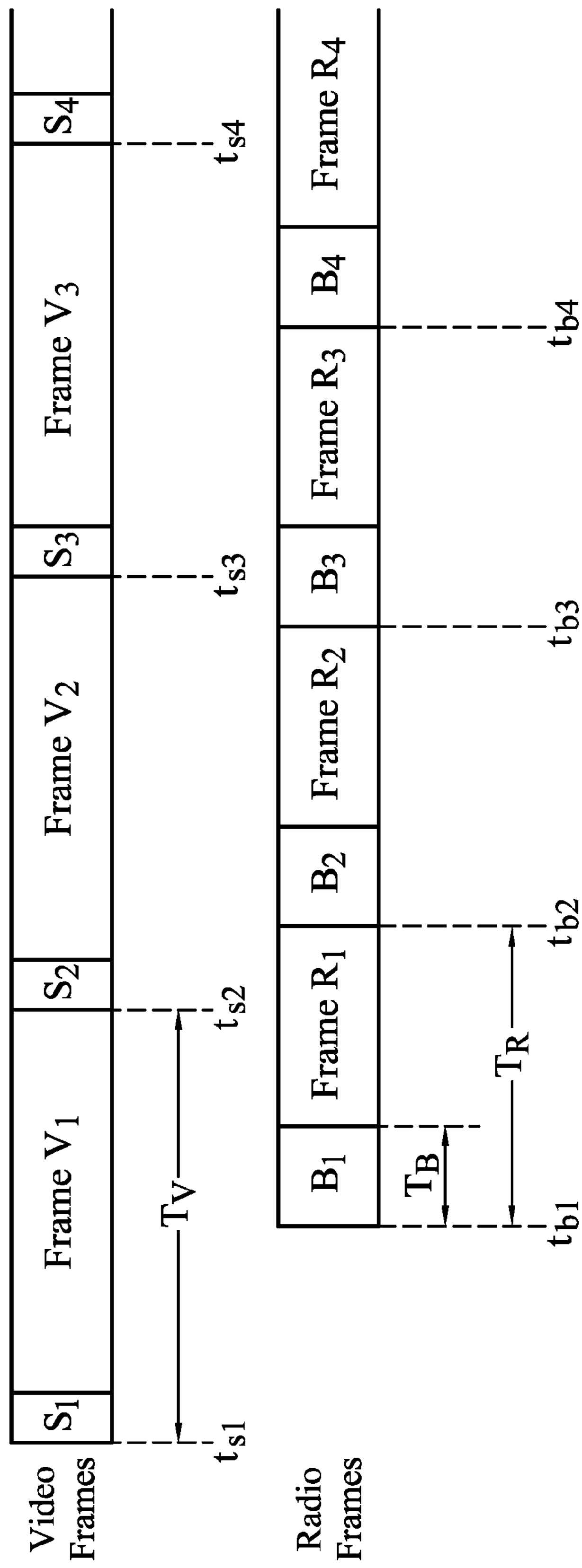
FIG. 1 is a schematic diagram of conventional radio transmission of video frames.
Figure 2:
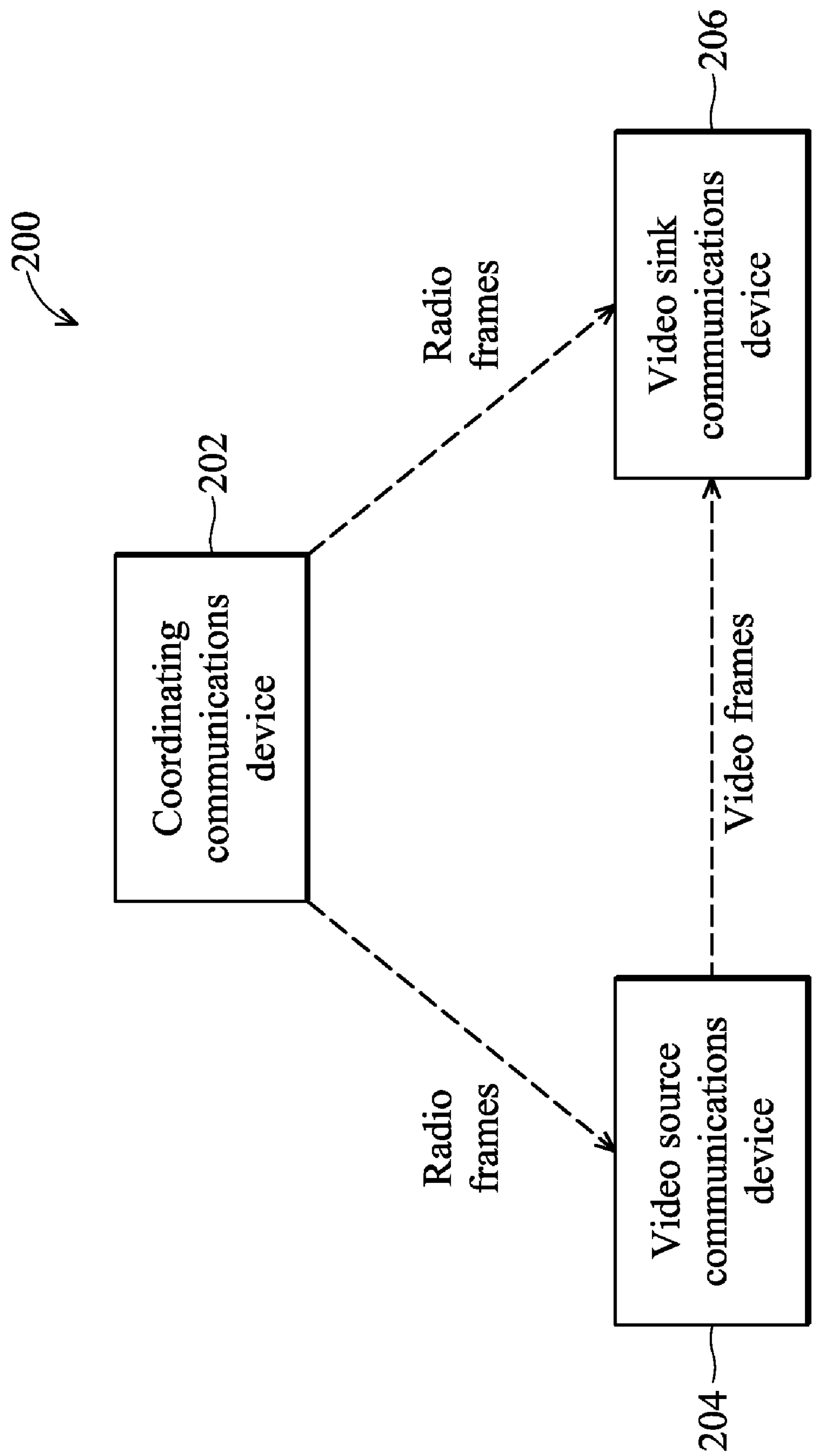
FIG. 2 is a block diagram of a wireless communications system for transmitting real-time streaming video according to an embodiment of the invention.

Referring to FIG. 2, a block diagram of a wireless communications system 200 for transmitting real-time streaming video according to an embodiment of the invention is shown. In this embodiment, the wireless communications system 200 comprises a coordinating communications device 202, a video source communications device 204, and a video sink communications device 206. The coordinating communications device 202 coordinates radio resource allocation of the wireless communications system 200. Before a communications device of the wireless communications system 200 establishes a streaming video session with a peer communications device, the communications device must send a channel request to the coordinating communications device 202. After the coordinating communications device grants the channel request, the communications device can then start to transmit data of the streaming video session via a channel in an access period granted by the coordinating communications device 202.

The coordinating communications device 202 transmits a predetermined bits sequence (a beacon) at the beginning of radio frames to all communications devices of the wireless communications system 200 at a rate with a constant interval. The coordinating communications device may or may not send beacons for every radio frames. In addition, the coordinating communications device 202 determines a radio frame duration length and informs all communications devices of the wireless communications system 200 about the radio frame duration length. The communications devices of the wireless communications system 200 thus transmit radio frames with the duration length determined by the coordinating communications device 202. In one embodiment, the coordinating communications device 202 computes the radio frame duration length according an algorithm or a protocol specification. The protocol specification specifies the radio frame duration length. The inputs to the algorithm include a set of parameters comprising radio channel characteristics and a number of active communications devices in the wireless communications system 200.

As an example, assume a video source communications device 204 wants to establish a video streaming session with the video sink communications device 206. The video source communications device 204 receives a video stream comprising a sequence of video frames from a video rendering device and then it sends the video frame of the video stream to the video sink communications device 206 via a communications channel of the wireless communications system 200. Because the video stream is isochronous, once the transmission of video frames between the video source communications device 204 and the video sink communications device 206 is started, each video frame must meet a strict latency constraint, or else the video frame would be considered to be lost.

To obtain the resource of a channel for transmitting data of the video stream, the video source communications device 204 first sends a channel resource request to the coordinating communications device 202. The radio frame duration length determined by the coordinating communications device 202, however, in this example, would not match with the duration of video frames of the video stream, complicating transmission of the video stream. In addition, the time of the beacons transmitted by the coordinating communications device 202 also would not match with the starting time of video frames of the video stream. The duration of video frames of the video stream is determined by a refresh rate of the video rendering device, hence the video source communications device 204, in this case, would not be able to change the duration of the video frames. Thus, to simplify the design and manufacturing cost of the video source communications device 204, the method proposed to solve the problem is as follows. The video source communications device 204 would request the coordinating communications device 202 to change the duration and starting time of radio frames in correspondence with the duration and starting time of video frames of the video stream.

In this case, the video source communications device 204 would first detect the duration and starting time of the video frames of the video stream. In one embodiment, the starting boundary of each video frame is marked with a specific bit pattern (start of frame symbol). The video source communications device 204 therefore detects the start of frame symbols to determine the starting time of the video frames of the video stream. The video source communications device 204 then forwards information about the duration and the starting time of video frames of the video stream to the coordinating communications device 202.

After the coordinating communications device 202 receives the information from the video source communications device 204, the coordinating communications device 202 compares and computes the difference between the duration of the video frames and the radio frames. If the duration of the radio frames does not match with the duration of the video frames, the coordinating communications device 202 would adjust the duration length of the radio frames to make the radio frame duration length match with the duration of the video frames. The coordinating communications device 202 derives the duration length and a starting time of the radio frames according to a predetermined rule based on the information received from the video source communications device 204. In one embodiment, the coordinating communications device 202 determines the duration length of a radio frame to be equal to the duration length of a video frame. In another embodiment, the coordinating communications device 202 determines the duration length of a radio frame to be equal to a multiple or a fraction of the duration length of a video frame. In addition, the coordinating communications device 202 may also change the time for transmitting succeeding beacons according to the starting time of the video frames. In one embodiment, the coordinating communications device 202 changes the time for transmitting succeeding beacons to make the difference between the starting time of the radio frames and the video frames to be less than a predetermined value. Thus, the starting time of a radio frame is substantially aligned with the starting time of a video frame.

The coordinating communications device 202 broadcasts a new duration length and transmits new succeeding beacons. The video source communications device sends a channel request to the coordinating communications device 202. The coordinating communications device 202 then allocates channel resource according to the channel request, and grants the video source communications device 204 the priority to access a requested radio channel during a requested access time period. The video source communications device 204 establishes a video streaming session via the radio channel and starts to transmits video frames carried by radio frames having the new duration length and starting time corresponding to the new succeeding beacons. Because the new duration length of the radio frames matches the duration of the video frames, and the starting time of the radio frames is substantially aligned with the starting time of the video frame, the video source communications device 204 smoothly transmits the video frames with the radio frames to the video sink communications device 206. As described, the circuit design of the video source communications device 204 is simplified when compared to conventional methods.

It is noted that in some embodiments, the coordinating communications device 202 and the video source communications device 204 can be implemented in the same machine. In some embodiments, the coordinating communications device 202 also determines when the change will take place, for example, the coordinating communications device 202 announces to change to the new duration length and starting time after four beacons.

Figure 3:
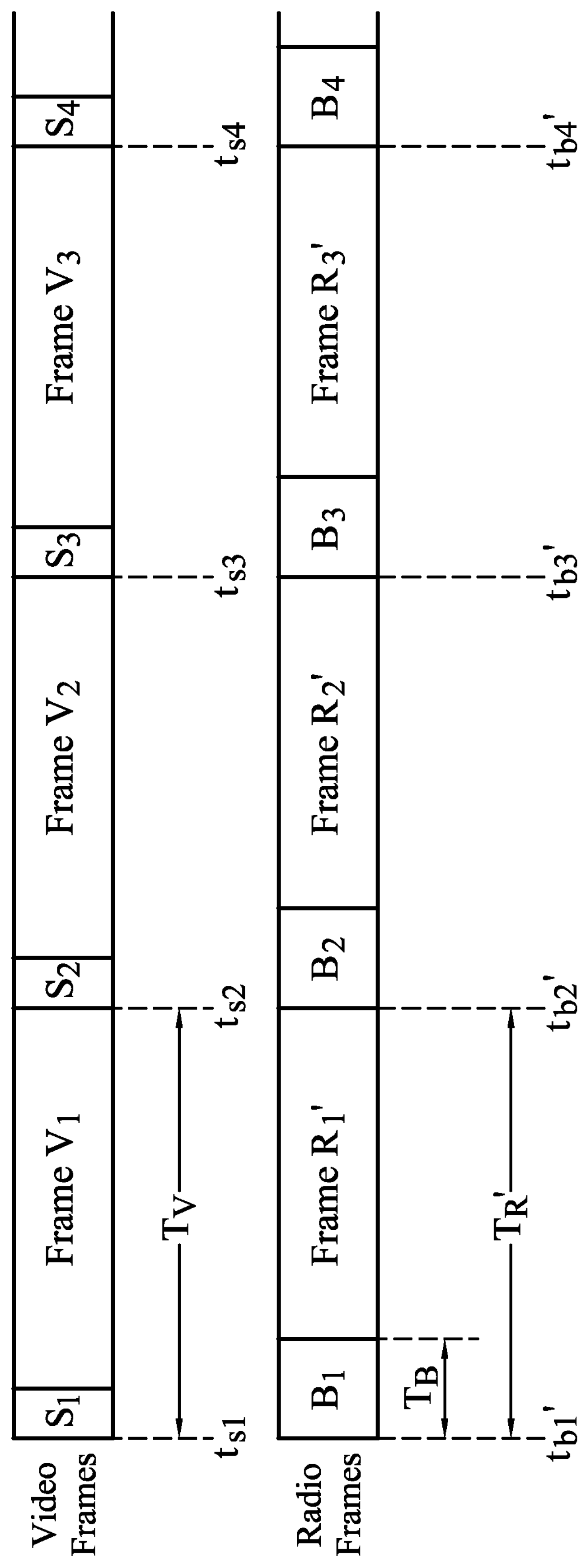
FIG. 3 is a schematic diagram of an embodiment of radio frames and video frames transmitted by a video source communications device.

Referring to FIG. 3, a schematic diagram of an embodiment of radio frames and video frames transmitted by the video source communications device 204 according to the embodiment of the invention is shown. Each of the video frames of the video streaming session established between the video source communications device 204 and the video sink communications device 206 has a duration $T_V$, and the radio frames transmitted by the video source communications device 204 also has duration length $T_R'$ equal to the duration $T_V$ of the video frames. In addition, the frame start symbols $S_1$, $S_2$, and $S_3$ of the video frames $V_1$, $V_2$, and $V_3$ have a staring time $t_{s1}$, $t_{s2}$, and $t_{s3}$. The radio frames $R_1'$, $R_2'$, and $R_3'$ have a starting time $t_{b1}'$, $t_{b2}'$, and $t_{b3}'$ which is aligned with the staring time $t_{s1}$, $t_{s2}$, and $t_{s3}$ of the corresponding video frames $V_1$, $V_2$, and $V_3$. The video frames $V_1$, $V_2$, and $V_3$ of the video stream are therefore smoothly transmitted by the radio frames $R_1'$, $R_2'$, and $R_3'$ which have an adjusted duration length and an adjusted starting time determined according to the information provided by the video source communications device 204. In other words, the video source communications device 404 forwards the video frames in a way that each video frame of the streaming video session coincides in time with one of the radio frames, wherein the video frames are forwarded within the boundaries of the radio frames.

The above embodiments use video streaming as an example to illustrate the invention, however, the invention is not limited to the transmission of video frames of a video stream. The invention should be applicable to any real-time streaming transmission over coordination-based systems.

Figure 4:
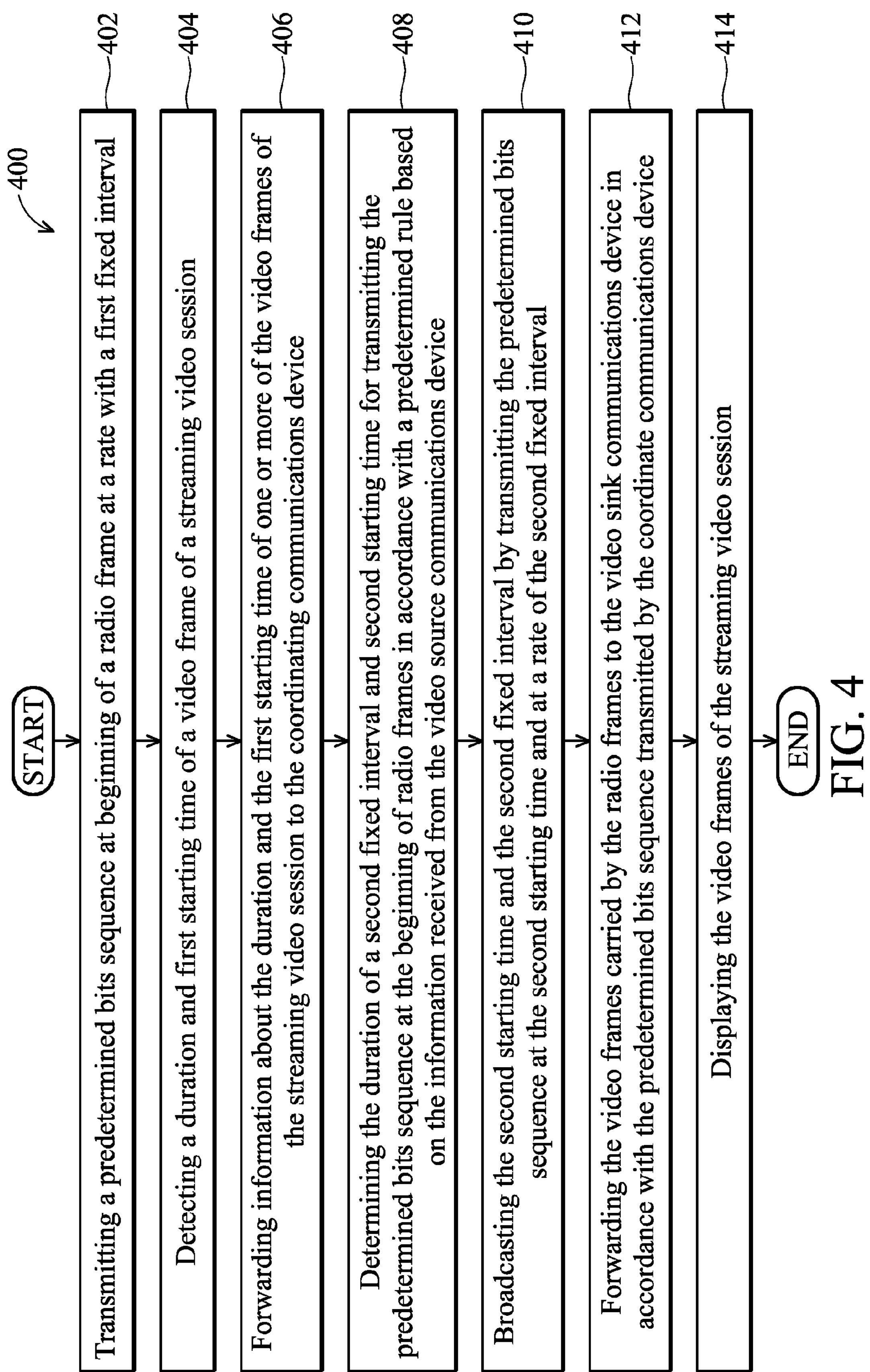
FIG. 4 is a flowchart of a method for more efficient utilization of radio resources for transmitting real-time streaming video according to an embodiment of the invention.

Referring to FIG. 4, a flowchart of a method 400 for more efficient utilization of radio resources for transmitting real-time streaming according to an embodiment of the invention is shown. In this embodiment, video streaming is still be used as an example since video applications are the most popular real-time streaming applications nowadays. The coordinating communications device 202 first transmits a predetermined bits sequence (beacon) at beginning of a radio frame at a rate with a first fixed interval (step 402). The video source communications device 204 detects a duration and first starting time of a video frame of a streaming video session (step 404). The video source communications device 204 then forwards information about the duration and the first starting time of one or more of the video frames of the streaming video session to the coordinating communications device 202. The coordinating communications device 202 determines the duration of a second fixed interval and second starting time for transmitting the predetermined bits sequence at the beginning of radio frames in accordance with a predetermined rule based on the information received from the video source communications device 204. The predetermined rule may also specify how and when the change takes place along with the frame duration and radio frame starting time. The coordinating communications device 202 broadcasts the second starting time and the second fixed interval by transmitting the predetermined bits sequence at the second starting time and at a rate of the second fixed interval (step 410). The video source communications device 204 forwards the video frames carried by the radio frames to the video sink communications device 204 in accordance with the predetermined bits sequences transmitted by the coordinating communications device 202 (step 412). Finally, the video sink communications device 206 displays the video frames of the streaming video session (step 414).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communications system, comprising:

a coordinating communications device, transmitting a predetermined bits sequence at the beginning of a radio frame at a rate of a first fixed interval; and a source communications device, receiving frames of a streaming session, detecting a duration and first starting time of a frame;

wherein the source communications device forwards information about the duration and the first starting time of one or more of the frames to the coordinating communications device;

wherein the coordinating communications device determines the duration of a second fixed interval and second starting time for transmitting the predetermined bits sequence in accordance with a predetermined rule based on the information received from the source communications device;

wherein the coordinating communications device transmits the predetermined bits sequence at the second starting time of the radio frame at a rate of the second fixed interval and the source communications device forwards the frames to a sink communications device.

2. The wireless communications system as claimed in claim 1, wherein according to the predetermined rule, the coordinating communications device determines the duration of the second fixed interval to be equal to the duration of the frames.

3. The wireless communications system as claimed in claim 1, wherein according to the predetermined rule, the coordinating communications device determines the duration of the second fixed interval to be equal to a multiple of the duration of the frames.

4. The wireless communications system as claimed in claim 1, wherein according to the predetermined rule, the coordinating communications device determines the duration of the second fixed interval to be equal to a fraction of the duration of the frames.

5. The wireless communications system as claimed in claim 1, wherein the source communications device forwards the frames to the sink communications device within the boundaries of the radio frames which have the duration of the second fixed interval and the second starting time.

6. The wireless communications system as claimed in claim 1, wherein the source communications device forwards the frames in a way that each frame of the streaming session coincides in time with one of the radio frames which have the duration of the second fixed interval and the second starting time.

7. The wireless communications system as claimed in claim 1, wherein the coordinating communications device determines a timing for changing to the duration of the second fixed interval and the second starting time.

8. The wireless communications system as claimed in claim 1, wherein the frames of the streaming session are video frames.

9. The wireless communications system as claimed in claim 1, wherein the difference between the first and second starting time is less than a predetermined value.

10. A method for efficient utilization of radio resources, wherein a wireless communications system comprises a coordinating communications device, a source communications device, and a sink communications device, and the source communications device receives frames of a streaming session to be forwarded to the sink communications device, comprising:

transmitting a predetermined bits sequence at the beginning of a radio frame by the coordinating communications device at a rate of a first fixed interval;

determining duration of a second fixed interval and a second starting time for transmitting the predetermined bits sequence at the beginning of a radio frame by the coordinating communications device in accordance with a predetermined rule based on information received from the source communications device, wherein the information comprises duration and first starting time of one or more of the frames of the streaming session; and transmitting the predetermined bits sequences by the coordinating communications device at the second starting time of each frame at a rate of the second fixed interval.

11. The method as claimed in claim 10, wherein the source communications device forwards the frames to the sink communications device within the boundaries of the radio frames having the duration of the second fixed interval and the second starting time.

12. The method as claimed in claim 10, wherein determining of the duration of the second fixed interval of the frames comprises determining the duration of the second fixed interval to be equal to the duration of each of the frames.

13. The method as claimed in claim 10, wherein determining of the duration of the second fixed interval of the frames comprises determining the duration of the second fixed interval to be equal to a multiple of the duration of each of the frames.

14. The method as claimed in claim 10, wherein determining of the duration of the second fixed interval of the frames comprises determining the duration of the second fixed interval to be equal to a fraction of the duration of each of the frames.

15. The method as claimed in claim 10, wherein the coordinating communications device determines a timing for changing to the duration of the second fixed interval and the second starting time.

16. The method as claimed in claim 10, wherein the frames of the streaming session are video frames.

17. The method as claimed in claim 10, wherein the difference between the first and second starting time is less than a predetermined value.

18. A method for efficient utilization of radio resources, wherein a wireless communications system comprises a coordinating communications device, a source communications device, and a sink communications device, and the coordinating communications device transmits a predetermined bits sequence at the beginning of each of the radio frames at a rate of a first fixed interval, the method comprising:

receiving by the source communications device frames of a streaming session;

detecting by the source communications device a duration and first starting time of the frames;

forwarding by the source communications device information about the duration and the first starting time of one or more of the frames of the streaming session to the coordinating communications device; and after the coordinating communications device determines the duration of a second fixed interval and a second starting time for transmitting the predetermined bits sequence at the beginning of a radio frame in accordance with a predetermined rule based on the information received from the source communications device and transmits the predetermined bits sequence at the second starting time of a radio frame at a rate of the second fixed interval, forwarding the frames by the source communications device to the sink communications device in accordance with the radio frames having the duration of the second fixed interval and the second starting time.

19. The method as claimed in claim 18, wherein forwarding of the frames comprises forwarding by the source communications device each frame of the streaming session within the boundaries of one of the radio frames which has the duration of the second fixed interval and the second starting time to the sink communications device.

20. The method as claimed in claim 18, wherein according to the predetermined rule, the coordinating communications device determines the duration of the second fixed interval to be equal to the duration of each of the frames.

21. The method as claimed in claim 18, wherein according to the predetermined rule, the coordinating communications device determines the duration of the second fixed interval to be equal to a multiple of the duration of each of the frames.

22. The method as claimed in claim 18, wherein the frames of the streaming session are video frames.

* * * * *